United States Patent
Zhang et al.

(10) Patent No.: US 10,909,337 B2
(45) Date of Patent: Feb. 2, 2021

(54) ARTICLE PROCESSING METHOD, TERMINAL, SYSTEM AND LPWAN GATEWAY

(71) Applicant: Advanced New Technologies Co., Ltd., Grand Cayman (KY)

(72) Inventors: Hong Zhang, Hangzhou (CN); Li Chen, Hangzhou (CN); Le Zhou, Hangzhou (CN); Sihai Yao, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/810,921

(22) Filed: Mar. 6, 2020

(65) Prior Publication Data
US 2020/0210653 A1    Jul. 2, 2020

Related U.S. Application Data

(63) Continuation of application No. PCT/CN2018/110758, filed on Oct. 18, 2018.

(30) Foreign Application Priority Data

Dec. 6, 2017 (CN) ............. 2017 1 1278630

(51) Int. Cl.
*G06K 7/10* (2006.01)
*G16Y 20/10* (2020.01)
(Continued)

(52) U.S. Cl.
CPC ..... *G06K 7/10128* (2013.01); *G06K 7/10108* (2013.01); *G06Q 10/087* (2013.01);
(Continued)

(58) Field of Classification Search
None
See application file for complete search history.

(56) References Cited

U.S. PATENT DOCUMENTS 9,501,046 B2 * 11/2016 Kalous .................. G05B 1/01
9,547,781 B2    1/2017 Lee et al.
(Continued)

FOREIGN PATENT DOCUMENTS

| CN | 101068160 | 11/2007 |
| CN | 101261721 | 9/2008 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Fekadeselassie Girma
(74) *Attorney, Agent, or Firm* — Fish & Richardson P.C.

(57) ABSTRACT

A control unit of the article processing terminal controls a radio frequency identification (RFID) reader of the article processing terminal to periodically scan a plurality of short-range articles. In response to a status change of an article of the plurality of short-range articles, the control unit receives an article identifier of the article from the RFID reader. The control unit controls a low-power wide-area network (LPWAN) module of the article processing terminal to send an article change message to a LPWAN gateway, where the article change message includes the article identifier and an address of an application server, and where the LPWAN gateway instructs, based on the article change message and the address, the application server to perform a next processing step on the article identified by the article identifier.

20 Claims, 3 Drawing Sheets

(51) Int. Cl.
*G16Y 40/10* (2020.01)
*G16Y 40/35* (2020.01)
*G16Y 40/60* (2020.01)
*G06Q 10/08* (2012.01)

(52) U.S. Cl.
CPC .......... *G06Q 10/0833* (2013.01); *G16Y 20/10* (2020.01); *G16Y 40/10* (2020.01); *G16Y 40/35* (2020.01); *G16Y 40/60* (2020.01)

(56) References Cited

U.S. PATENT DOCUMENTS

| | | | |
|---|---|---|---|
| 9,652,955 B1 | 5/2017 | Ray et al. | |
| 2002/0124011 A1* | 9/2002 | Baxter | G05B 19/418 |
| 2005/0246224 A1* | 11/2005 | McKanna | G06Q 10/08 |
| | | | 705/13 |
| 2007/0120647 A1* | 5/2007 | Min | H04L 29/12594 |
| | | | 340/10.1 |
| 2009/0231138 A1* | 9/2009 | Lai | G06K 19/0712 |
| | | | 340/572.4 |
| 2011/0012713 A1* | 1/2011 | Wilkinson | G06K 7/10297 |
| | | | 340/10.3 |
| 2012/0273191 A1* | 11/2012 | Schmidt | E21B 43/26 |
| | | | 166/250.1 |
| 2013/0125515 A1* | 5/2013 | Delaney | G06Q 50/22 |
| | | | 53/473 |
| 2013/0300541 A1* | 11/2013 | Pesonen | G01S 5/0289 |
| | | | 340/10.1 |
| 2014/0104264 A1 | 4/2014 | Kim et al. | |
| 2016/0267300 A1* | 9/2016 | Zumsteg | G06Q 10/087 |
| 2017/0032316 A1* | 2/2017 | Benedict | B61L 25/048 |
| 2018/0062873 A1* | 3/2018 | Chiang | H04W 4/18 |
| 2018/0182196 A1* | 6/2018 | Duan | G07C 9/00571 |
| 2018/0314808 A1* | 11/2018 | Casey | H04W 4/02 |
| 2019/0072941 A1* | 3/2019 | Kooken | B23K 9/173 |
| 2019/0104465 A1* | 4/2019 | Sakoda | H04W 8/005 |

FOREIGN PATENT DOCUMENTS

| | | |
|---|---|---|
| CN | 102195807 | 9/2011 |
| CN | 203338380 | 12/2013 |
| CN | 106302474 | 1/2017 |
| CN | 106790643 | 5/2017 |
| CN | 108197672 | 6/2018 |
| KR | 100872398 | 12/2008 |
| TW | I496096 | 8/2015 |
| WO | WO 2004023389 | 3/2004 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Appln. PCT/CN2018/110758, dated Jan. 22,3 2019, 9 pages (with partial English translation).

European Extended Search Report in European Appln No. 18885870.8, dated Jul. 23, 2020, 11 pages.

PCT International Preliminary Report on Patentability in International Appln. No. PCT/CN2018/110758, dated Jun. 9, 2020, 11 pages (with English translation).

Dieng et al, "A Study on IoT Solutions for Preventing Cattle Rustling in African Context," ACM, Mar. 22, 2017, 11 pages.

* cited by examiner

ARTICLE PROCESSING METHOD, TERMINAL, SYSTEM AND LPWAN GATEWAY

CROSS-REFERENCE TO RELATED APPLICATIONS

This application is a continuation of PCT Application No. PCT/CN2018/110758, filed on Oct. 18, 2018, which claims priority to Chinese Patent Application No. 201711278630.5, filed on Dec. 6, 2017, and each application is hereby incorporated by reference in its entirety.

TECHNICAL FIELD

Implementations of the present specification relate to the field of computer technology, and in particular, to an article processing method, a terminal, a system, and an LPWAN gateway.

BACKGROUND

In conventional technologies, long-range processing is usually performed on articles, for example, by using a radio frequency identification (RFID) technology. Therefore, a solution for implementing short-range processing on the articles is needed.

SUMMARY

Implementations of the present specification describe an article processing method, a terminal, a system, and an LPWAN gateway, to perform short-range processing on articles, thereby improving accuracy of article processing.

According to a first aspect, an article processing method is provided, including: controlling, by the control unit, an RFID reader to periodically scan a plurality of short-range articles; when any one of the plurality of short-range articles changes, receiving, by the control unit, an article identifier of the article sent by the RFID reader; and controlling, by the control unit, the LPWAN module to send an article change message to the LPWAN gateway, where the article change message includes the article identifier and an address of an application server; and the article change message is used to instruct the LPWAN gateway to instruct, based on the address, the application server to perform a next processing step on the article identified by the article identifier.

According to a second aspect, an article processing method is provided, including: receiving, by an LPWAN gateway, an article change message sent by an article processing terminal, where the article change message includes an article identifier of a changed article and an address of an application server; and the article identifier is read by the article processing terminal by using an RFID reader; and sending, by the LPWAN gateway, an article change notification to the application server based on the address, where the article change notification includes the article identifier; and the article change notification is used to instruct the application server to perform a next processing step on the article identified by the article identifier.

According to a third aspect, an article processing terminal is provided, including: a control unit, configured to periodically send a scanning instruction to an RFID reader; and an RFID reader, configured to periodically scan a plurality of short-range articles based on the scanning instruction; and when any one of the plurality of short-range articles changes, send an article identifier of the article to the control unit, where the control unit is further configured to: receive the article identifier; and send a sending instruction to an LPWAN module; and the LPWAN module, configured to send an article change message to an LPWAN gateway based on the sending instruction, where the article change message includes the article identifier and an address of an application server; and the article change message is used to instruct the LPWAN gateway to instruct, based on the address, the application server to perform a next processing step on the article identified by the article identifier.

According to a fourth aspect, an LPWAN gateway is provided, including: a receiving unit, configured to receive an article change message sent by an article processing terminal, where the article change message includes an article identifier of a changed article and an address of an application server; and the article identifier is read by the article processing terminal by using an RFID reader; and a sending unit, configured to send an article change notification to the application server based on the address, where the article change notification includes the article identifier; and the article change notification is used to instruct the application server to perform a next processing step on the article identified by the article identifier.

According to a fifth aspect, an article processing system is provided, including: an article processing terminal, configured to periodically scan a plurality of short-range articles, and send an article identifier of a changed article to an LPWAN gateway; the LPWAN gateway, configured to: receive the article identifier of the changed article; and send the article identifier to an application server; the application server, configured to: receive the article identifier to perform a next processing step on the article identified by the article identifier, and obtain attribute information of the article based on the article identifier; and send the attribute information to a multimedia display; and the multimedia display, configured to receive the attribute information and display the attribute information.

According to the article processing method, terminal, system and LPWAN gateway provided in implementations of the present specification, a control unit controls the RFID reader to periodically scan a plurality of short-range articles. When any one of the plurality of short-range articles changes, the RFID reader obtains an article identifier of the article and sends the article identifier to a control unit. After receiving the article identifier, the control unit controls an LPWAN module to send an article change message to the LPWAN gateway. The LPWAN gateway instructs, based on the received article change message, an application server to perform a next processing step on the article. Therefore, short-range processing is performed on articles, and the accuracy of article processing is improved.

BRIEF DESCRIPTION OF DRAWINGS

To describe technical solutions of implementations of the present specification more clearly, the following briefly introduces the accompanying drawings required for describing the implementations. Apparently, the accompanying drawings in the following description are merely some implementations of the present specification, and for those skilled in the art, other drawings can be obtained according to these drawings without creative labor.

DESCRIPTION OF IMPLEMENTATIONS

Solutions provided in the present specification are described below with referent to accompanying drawings.

Figure 1:
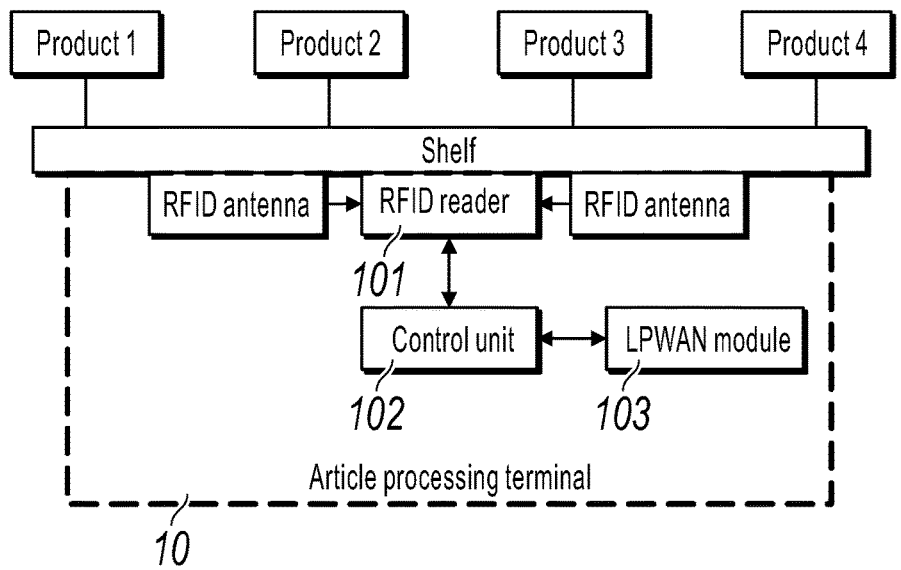
FIG. 1 is a schematic diagram of an article processing terminal according to an implementation of the present specification.

FIG. 1 is a schematic diagram of an article processing terminal 10 according to an implementation of the present specification. In FIG. 1, article processing terminal 10 includes radio frequency identification (RFID) reader 101, control unit 102, and low-power wide-area network (LPWAN) module 103. RFID reader 101 may communicate with control unit 102 by using a general purpose input/output (GPIO) interface, a universal asynchronous receiver/transmitter (UART) interface, or an Ethernet interface. Control unit 102 may communicate with LPWAN module 103 by using the GPIO interface or the serial port.

In FIG. 1, RFID reader 101 may be a near field communication (NFC) reader or an ultra-high frequency (UHF) RFID reader. Control unit 102 may be a microcontroller unit (MCU). LPWAN module 103 may be a Lora module or a cellular-based narrowband Internet of Things (NB-IOT). Control unit 102 may control RFID reader 101 to periodically (for example, 300 ms) scan a plurality of short-range (for example, within 10 cm) articles to detect whether any article has changed (for example, picked up or put down). When detecting that an article has changed, RFID reader 101 may send an article identifier of the article to control unit 102. Control unit 102 may read attribute information (for example, origin and composition) of the article based on the article identifier. Control unit 102 may then control LPWAN module 103 to send the article identifier, attribute information, and/or change status information) of the article to the LPWAN gateway. The change status information of the article may be, for example, being picked up from a position or being put down at a position.

It is worthwhile to note that a process in which RFID reader 101 scans a plurality of short-range articles is a process in which RFID reader 101 recognizes electronic tags on the articles by using an RFID antenna (for example, a printed circuit board (PCB) near-field antenna). It can be understood that when RFID reader 101 is a UHF RFID reader, it can connect a plurality of RFID antennas. Because the above identification process belongs to a conventional technology, details are omitted here.

It is also worthwhile to note that when the recognized article is a commodity on a shelf, article processing terminal 10 may be directly embedded on the shelf. Therefore, the problem of high false identification rate caused by light, occlusion and the like when objects are recognized at a long-range is solved.

Certainly, in practice, the article processing terminal may also include other modules, for example, a battery, and details are omitted in the present application.

Figure 2:
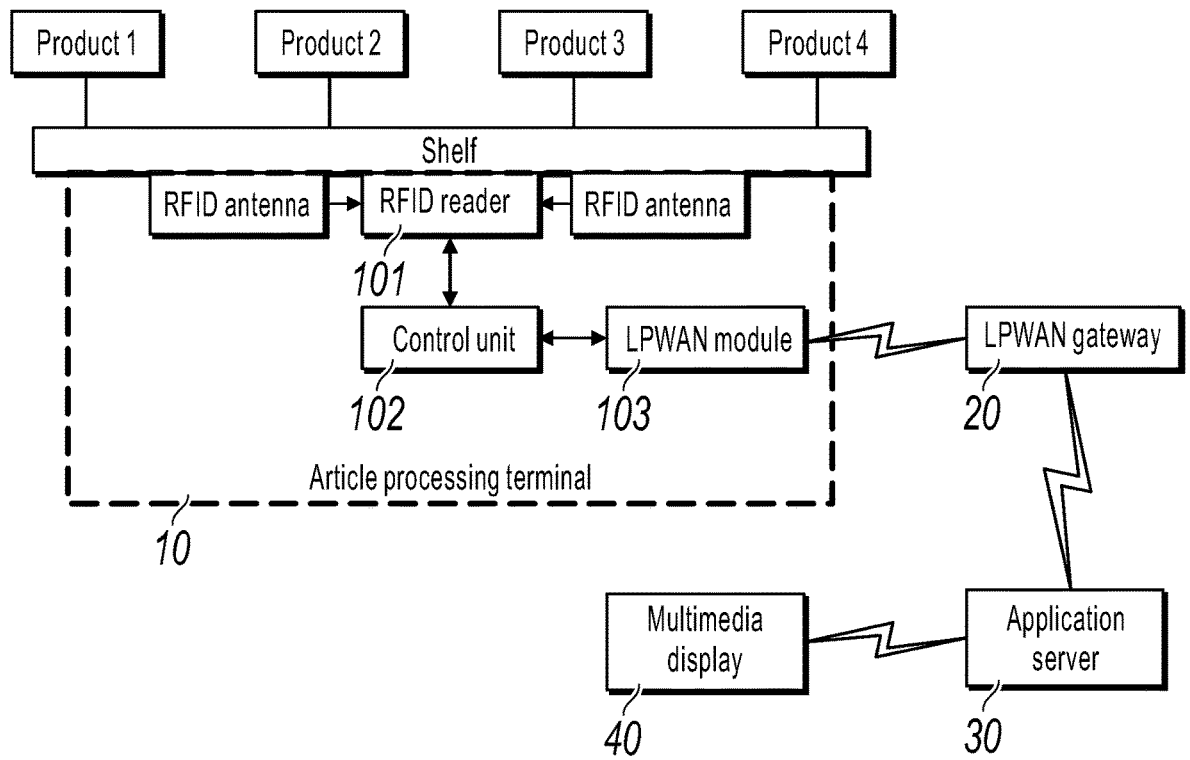
FIG. 2 is a schematic diagram of an article processing system according to an implementation of the present specification.

The article processing system shown in FIG. 2 may be constituted by article processing terminal 10 shown in FIG. 1, LPWAN gateway 20, application server 30, and multimedia display 40. The article processing system is configured for processing (for example, tracking) the commodity. In FIG. 2, article processing terminal 10 may be embedded and installed on the shelf to accurately identify a plurality of short-range articles. LPWAN gateway 20 can be connected to tens of thousands of nodes (for example, article processing terminals), and has high scalability and flexibility. Application server 30 may be a cloud server. Multimedia display 40 may include an android smart television (TV) and an apple TV, which can display attribute information (for example, origin and composition) to a user. It is also worthwhile to note that article processing terminal 10 is connected to LPWAN gateway 20 through the LPWAN, where the distance between the two is usually not more than two kilometers. LPWAN gateway 20, application server 30, and multimedia display 40 are connected through the Internet.

When recognizing that an article on the shelf has changed (for example, an article is picked up), article processing terminal 10 may send an article change message to LPWAN gateway 20. After receiving the article change message, LPWAN gateway 20 may instruct application server 30 to perform corresponding processing (for example, tracking) on the article, for example, recording change status information of the changed article (for example, recording that an article is picked up at a location). After recording the change status information, application server 30 may send attribute information of the commodity to multimedia display 40. Multimedia display 40 displays the attribute information of the commodity to the user, so that the user can better understand the commodity.

In FIG. 2, application server 30 may also analyze and manage the recorded change status information after a period of time. That is, the article processing terminal provided in the implementation of the present specification has a function of data analysis and management.

Figure 3:
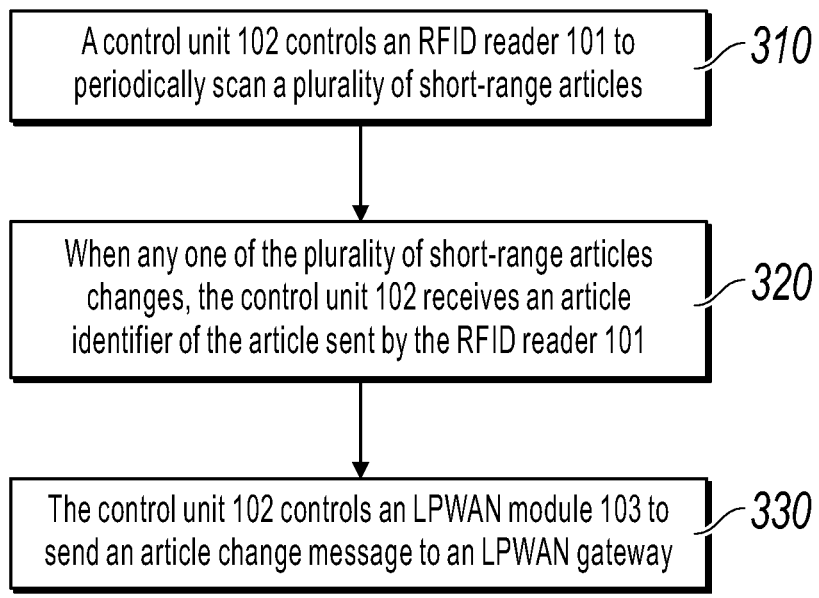
FIG. 3 is a flowchart of an article processing method according to an implementation of the present specification.

FIG. 3 is a flowchart of an article processing method according to an implementation of the present specification. The method may be performed by a device having a processing capability: a server, a system or an apparatus, for example, the article processing terminal 10 in FIG. 1 or FIG. 2. As shown in FIG. 3, the method may include the following steps:

Step 310: Control unit 102 controls RFID reader 101 to periodically scan a plurality of short-range articles.

The short-range articles may refer to articles within 10 cm. The plurality of short-range articles have corresponding electronic tags.

Control unit 102 may periodically (for example, 300 ms) send a scanning instruction to the RFID reader 101 by using a GPIO/UART/Ethernet interface. After receiving the scan instruction, RFID reader 101 can recognize the plurality of short-range articles by using an RFID antenna. In a specific example, article processing terminal 10 can pre-store an article list, which includes article identifiers of all articles. While recognizing the articles through the RFID antenna, RFID reader 101 obtains the article identifier of each article. RFID reader 101 can compare the obtained article identifier with the article identifier in the article list to determine whether there is a change in the article and the article identifier of the changed article. For example, when an article identifier, which is recorded in the article list, is not currently obtained, the article identifier is the article identifier of the lost article.

In an example in which the commodity on the shelf is scanned by the article processing terminal, when the commodity is 30 cm away from the original position, RFID reader 101 cannot recognize the commodity, that is, cannot obtain the commodity identifier of the commodity.

Step 320: When any one of the plurality of short-range articles changes, control unit 102 receives an article identifier of the article sent by RFID reader 101.

As described in the previous example, after determining that the article has changed and determining the article identifier of the changed article, RFID reader 101 may send the article identifier to control unit 102. After receiving the article identifier, control unit 102 may read the attribute information of the article from the RFID reader 101 based on the article identifier. It can be understood that the attribute information is obtained by RFID reader 101 during the process of recognizing the articles by using the RFID antenna.

Step 330: Control unit 102 controls LPWAN module 103 to send the article change message to the LPWAN gateway.

Control unit 102 may communicate with LPWAN module 103 by using the GPIO interface or the serial port. After receiving the sending instruction, LPWAN module 103 sends an article change message to LPWAN gateway 20 through the LPWAN. It can be understood that the article change message may include protocol data (for example, Lora protocol data), an article identifier of a changed article (or an article identifier, attribute information, and/or change status information), an identifier of an article processing terminal, an address of application server 30, and the like.

After receiving the article change message, LPWAN gateway 20 can separate protocol data from the article change message. Then, based on the address of application server 30, the article identifier (or an article identifier, attribute information, and/or change status information) of a changed article and the identifier of the article processing terminal are sent to application server 30. Thus, application server 30 performs corresponding processing, for example, recording the change status information of the article. For example, when application server 30 receives the change state information of the lost article, and the change state information is: picked up from a shelf I of store A, application server 30 will record that: the x x article is picked up from the shelf I of store A. After the change status information is recorded, if the attribute information is received, the attribute information of the article can be sent to multimedia display 40 so that the user can better understand the commodity.

It is worthwhile to note that, for communication security, LPWAN gateway 20 usually encrypts a message when sending the message to application server 30. Application server 30 decrypts the encrypted message first and then processes it accordingly (for example, tracking).

It is also worthwhile to note that application server 30 in the previous implementation of the present specification may analyze the change state information related to an article after a period of time (for example, a day) and feed back an analysis result to a manufacturer. For example, if a dress is picked up many times in a day, but eventually it is put down, an obtained analysis result may be that: the dress may look good, but it is uncomfortable to wear. That is, application server 30 can collect the trend data of the commodity, thus greatly promoting the fine data operation of the retail industry.

Figure 4:
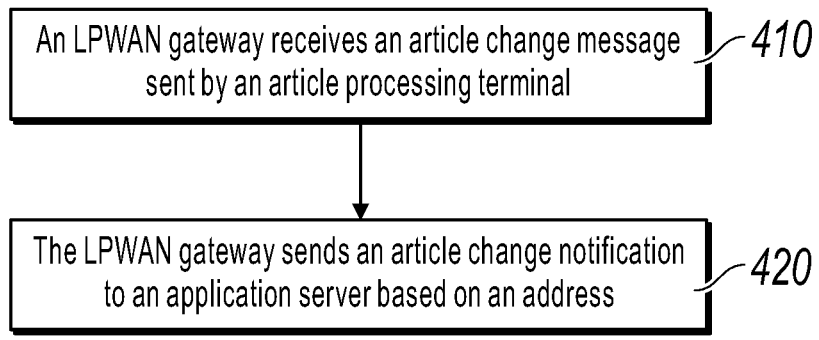
FIG. 4 is a flowchart of an article processing method according to another implementation of the present specification.

FIG. 4 is a flowchart of an article processing method according to another implementation of the present specification. The method may be performed by LPWAN gateway 102 in FIG. 2. As shown in FIG. 4, the method may include the following steps:

Step 410: An LPWAN gateway receives an article change message sent by an article processing terminal.

Article processing terminal 10 scans by using RFID reader 101 for change in the article. If an article changes, a change message is sent to LPWAN gateway 20. The article change message may include the article identifier of the changed article and the address of application server 30.

Step 420: The LPWAN gateway sends an article change notification to the application server based on the address.

The article change notification includes the article identifier. After receiving the article change notification, application server 30 performs a next processing step on the article identified by the article identifier, for example, recording the change status information of the article.

Figure 5:
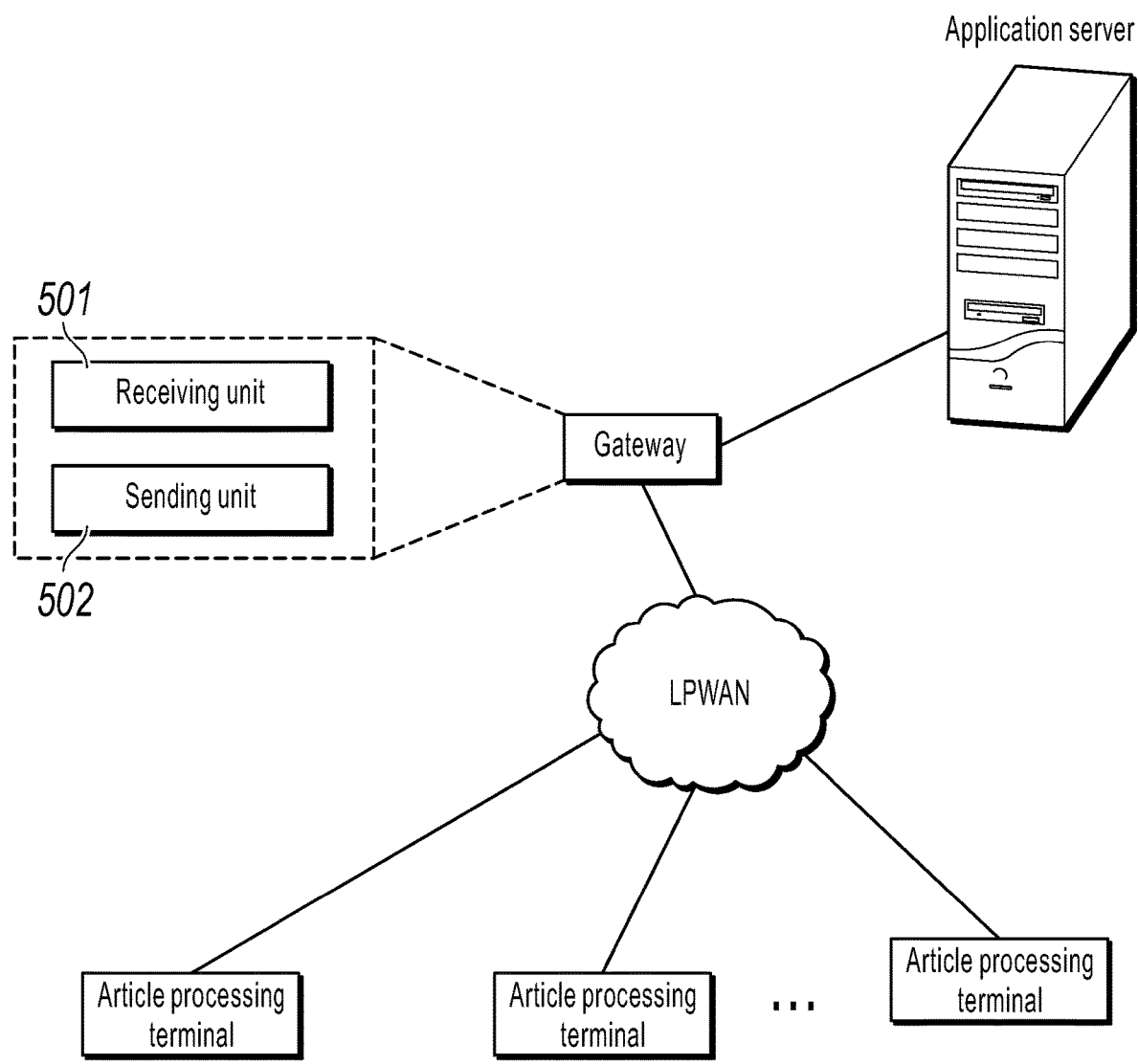
FIG. 5 is a schematic diagram of an LPWAN gateway according to an implementation of the present specification.

An LPWAN gateway is also provided in an implementation of the present specification. As shown in FIG. 5, the gateway includes: receiving unit 501 and sending unit 502.

The receiving unit 501 is configured to receive an article change message sent by an article processing terminal, where the article change message includes an article identifier of a changed article and an address of an application server. The article identifier is read by the article processing terminal by using the RFID reader.

The sending unit 502 is configured to send an article change notification to the application server based on the address, where the article change notification includes an article identifier. The article change notification is used to instruct the application server to perform a next processing step on the article identified by the article identifier.

The functions of the functional modules of the apparatus in the previous implementations of the present specification may be implemented by performing the steps of the previous method implementations. Therefore, details of a specific operation process of the apparatus provided in one implementation of the present specification are omitted here.

The LPWAN gateway provided in an implementation of the present specification may receive the article change message sent by the article processing terminal and send the article change message to the application server. Thus, the short-range processing on the article is realized.

Those skilled in the art should recognize that in one or more of the previous examples, the functions described in the present specification may be implemented in hardware, software, firmware, or any combination thereof. When being implemented using software, these functions can be stored in a computer-readable medium or transmitted as one or more instructions or codes on the computer-readable medium.

The purpose, technical solutions and beneficial effects of the present specification are further described in detail in the specific implementation described above. It should be understood that the above description is merely a specific implementation of the present specification and is not intended to limit the protection scope of the present specification. Any modification, equivalent replacement and improvement made on the basis of the technical solutions of the present specification should be included in the protection scope of the present specification.

What is claimed is:

1. An article processing method performed by an article processing terminal, comprising:
controlling, by a control unit of the article processing terminal, a radio frequency identification (RFID) reader of the article processing terminal to continually scan for signals generated by electronic tags of a plurality of short-range articles;

receiving, by the control unit and from the RFID reader, an article identifier of an article of the plurality of short-range articles, the article identifier being generated by the RFID reader in response to a detected status change of the article; and controlling, by the control unit, a low-power wide-area network (LPWAN) module of the article processing terminal to send an article change message to a LPWAN gateway, wherein the article change message comprises the article identifier and an address of an application server, and wherein the LPWAN gateway instructs, based on the article change message and the address, the application server to record change status information representing one or more properties of the signals generated by the electronic tags.

2. The method according to claim 1, wherein the RFID reader is a near field communication (NFC) reader or an ultra-high frequency (UHF) RFID reader.

3. The method according to claim 1, wherein the LPWAN module is a Long Range (LoRa) module or a cellular-based narrowband Internet of Things (NB-IOT).

4. The method according to claim 1, wherein controlling the RFID reader of the article processing terminal to periodically scan the plurality of short-range articles comprises:

controlling, by the control unit and by using a general purpose input/output (GPIO) interface, a universal asynchronous receiver/transmitter (UART) interface, or an Ethernet interface, an RFID reader to periodically scan a plurality of short-range articles.

5. The method according to claim 1, wherein controlling the LPWAN module of the article processing terminal to send the article change message to the LPWAN gateway comprises:

controlling, by the control unit and by using a general purpose input/output (GPIO) interface, the LPWAN module to send the article change message to the LPWAN gateway.

6. The method according to claim 1, further comprising:

obtaining, by the article processing terminal and by scanning the plurality of short-range articles, a plurality of article identifiers corresponding to the plurality of short-range articles; and determining, by the article processing terminal, the status change of the article, based on comparing the plurality of article identifiers with an additional plurality of article identifiers stored in the article processing terminal.

7. The method according to claim 6, wherein determining the status change of the article further comprises:

determining, by the article processing terminal, that the additional plurality of article identifiers do not comprise the article identifier of the article; and determining, by the article processing terminal, that the article has been picked up.

8. A non-transitory, computer-readable medium storing one or more instructions executable by a computer system to perform operations comprising:

controlling, by a control unit of an article processing terminal, a radio frequency identification (RFID) reader of the article processing terminal to continually scan for signals generated by electronic tags of a plurality of short-range articles;

receiving, by the control unit and from the RFID reader, an article identifier of an article of the plurality of short-range articles, the article identifier being generated by the RFID reader in response to a detected status change of the article; and controlling, by the control unit, a low-power wide-area network (LPWAN) module of the article processing terminal to send an article change message to a LPWAN gateway, wherein the article change message comprises the article identifier and an address of an application server, and wherein the LPWAN gateway instructs, based on the article change message and the address, the application server to record change status information representing one or more properties of the signals generated by the electronic tags.

9. The non-transitory, computer-readable medium according to claim 8, wherein the RFID reader is a near field communication (NFC) reader or an ultra-high frequency (UHF) RFID reader.

10. The non-transitory, computer-readable medium according to claim 8, wherein the LPWAN module is a Long Range (LoRa) module or a cellular-based narrowband Internet of Things (NB-IOT).

11. The non-transitory, computer-readable medium according to claim 8, wherein controlling the RFID reader of the article processing terminal to periodically scan the plurality of short-range articles comprises:

controlling, by the control unit and by using a general purpose input/output (GPIO) interface, a universal asynchronous receiver/transmitter (UART) interface, or an Ethernet interface, an RFID reader to periodically scan a plurality of short-range articles.

12. The non-transitory, computer-readable medium according to claim 8, wherein controlling the LPWAN module of the article processing terminal to send the article change message to the LPWAN gateway comprises:

controlling, by the control unit and by using a general purpose input/output (GPIO) interface, the LPWAN module to send the article change message to the LPWAN gateway.

13. The non-transitory, computer-readable medium according to claim 8, further comprising:

obtaining, by the article processing terminal and by scanning the plurality of short-range articles, a plurality of article identifiers corresponding to the plurality of short-range articles; and determining, by the article processing terminal, the status change of the article, based on comparing the plurality of article identifiers with an additional plurality of article identifiers stored in the article processing terminal.

14. The non-transitory, computer-readable medium according to claim 13, wherein determining the status change of the article further comprises:

determining, by the article processing terminal, that the additional plurality of article identifiers do not comprise the article identifier of the article; and determining, by the article processing terminal, that the article has been picked up.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

controlling, by a control unit of an article processing terminal, a radio frequency identification (RFID) reader of the article processing terminal to continually scan for signals generated by electronic tags of a plurality of short-range articles;

receiving, by the control unit and from the RFID reader, an article identifier of an article of the plurality of short-range articles, the article identifier being generated by the RFID reader in response to a detected status change of the article; and controlling, by the control unit, a low-power wide-area network (LPWAN) module of the article processing terminal to send an article change message to a LPWAN gateway, wherein the article change message comprises the article identifier and an address of an application server, and wherein the LPWAN gateway instructs, based on the article change message and the address, the application server to record change status information representing one or more properties of the signals generated by the electronic tags.

16. The computer-implemented system according to claim 15, wherein the RFID reader is a near field communication (NFC) reader or an ultra-high frequency (UHF) RFID reader.

17. The computer-implemented system according to claim 15, wherein the LPWAN module is a Long Range (LoRa) module or a cellular-based narrowband Internet of Things (NB-IOT).

18. The computer-implemented system according to claim 15, wherein controlling the RFID reader of the article processing terminal to periodically scan the plurality of short-range articles comprises:

controlling, by the control unit and by using a general purpose input/output (GPIO) interface, a universal asynchronous receiver/transmitter (UART) interface, or an Ethernet interface, an RFID reader to periodically scan a plurality of short-range articles.

19. The computer-implemented system according to claim 15, wherein controlling the LPWAN module of the article processing terminal to send the article change message to the LPWAN gateway comprises:

controlling, by the control unit and by using a general purpose input/output (GPIO) interface, the LPWAN module to send the article change message to the LPWAN gateway.

20. The computer-implemented system according to claim 15, further comprising:

obtaining, by the article processing terminal and by scanning the plurality of short-range articles, a plurality of article identifiers corresponding to the plurality of short-range articles; and determining, by the article processing terminal, the status change of the article, based on comparing the plurality of article identifiers with an additional plurality of article identifiers stored in the article processing terminal.

* * * * *